US012700108B2

(12) United States Patent (10) Patent No.: US 12,700,108 B2
Yamamoto et al. (45) Date of Patent: Aug. 4, 2026

(54) OBJECT TRACKING DEVICE AND OBJECT TRACKING METHOD

(71) Applicant: KYOCERA Corporation, Kyoto (JP)

(72) Inventors: Kenji Yamamoto, Yokohama (JP); Jun Kuroda, Kodaira (JP); Tooru Sahara, Yokohama (JP); Fangwei Tong, Fukuoka (JP); Takuya Homma, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 256 days.

(21) Appl. No.: 18/557,465

(22) PCT Filed: Apr. 20, 2022

(86) PCT No.: PCT/JP2022/018330
§ 371 (c)(1),
(2) Date: Oct. 26, 2023

(87) PCT Pub. No.: WO2022/230738
PCT Pub. Date: Nov. 3, 2022

(65) Prior Publication Data
US 2024/0212172 A1 Jun. 27, 2024

(30) Foreign Application Priority Data

Apr. 27, 2021 (JP) ................................. 2021-075289

(51) Int. Cl.
*G06T 7/277* (2017.01)
(52) U.S. Cl.
CPC .................................... *G06T 7/277* (2017.01)
(58) Field of Classification Search
CPC ...................... G06T 2207/30252; G06T 7/277
See application file for complete search history.

(56) References Cited

U.S. PATENT DOCUMENTS

| | | | | |
|---|---|---|---|---|
| 5,331,562 A | * | 7/1994 | McGuffin | G01C 21/005 |
| | | | | 342/63 |
| 2008/0306666 A1 | * | 12/2008 | Zeng | B60Q 9/006 |
| | | | | 701/70 |
| 2023/0394682 A1 | | 12/2023 | Yamamoto et al. | |

FOREIGN PATENT DOCUMENTS

| | | |
|---|---|---|
| CN | 116635919 A | 8/2023 |
| EP | 4 239 616 A1 | 9/2023 |
| JP | H11-321494 A | 11/1999 |

OTHER PUBLICATIONS

Karlsson, R.; "Simulation Based Methods for Target Tracking"; Linkoping Studies in Science and Technology; Thesis No. 930; 2002; total 140 pages; UniTryck; Linkoping, Sweden; https://www.rt.isy.liu.se/research/reports/LicentiateThesis/Lic930.pdf.

* cited by examiner

*Primary Examiner* — Zhiyu Lu
(74) *Attorney, Agent, or Firm* — Studebaker Brackett PLLC

(57) ABSTRACT

An object tracking device and object tracking method that can track an object accurately without increasing the computational load are provided. An object tracking device (20) includes an input interface (21), a processor (23), and an output interface (24). The input interface (21) is configured to acquire sensor data. The processor (23) is configured to detect a detection target from the sensor data and track the detection target using Kalman filters associated with each of the detection target and an observed value. The output interface (24) is configured to output a detection result regarding the detection target. The processor (23) is configured to execute a first process to select a Kalman filter with low certainty from among a plurality of the Kalman filters associated with the same detection target or observed value as an exclusion candidate Kalman filter that could be (Continued)

excluded from the association, and a second process to exclude from the association and initialize the exclusion candidate Kalman filter that meets an initialization condition.

6 Claims, 10 Drawing Sheets

FIG. 8

KF (q) ERROR ELLIPSE

KF (p) ERROR ELLIPSE

SAME OBSERVED VALUE

KF (r) ERROR ELLIPSE

KF (q) ERROR ELLIPSE

DETERMINED TO TRACK SAME OBJECT

KF (p) ERROR ELLIPSE

KF (r) ERROR ELLIPSE

OBJECT TRACKING DEVICE AND OBJECT TRACKING METHOD

CROSS-REFERENCE TO RELATED APPLICATIONS

This application claims priority based on Japanese Patent Application No. 2021-075289 (filed Apr. 27, 2021), the entire disclosure of which is hereby incorporated by reference.

TECHNICAL FIELD

The present disclosure relates to an object tracking device and an object tracking method.

BACKGROUND OF INVENTION

A known technology detects a nearby object and performs tracking to predict the motion of the detected object. For example, Patent Literature 1 discloses a device that detects the presence or absence of approaching vehicles and pedestrians by processing an image signal. The image signal is outputted from a vehicle-mounted camera that captures images around the vehicle. The device displays approaching vehicles and pedestrians, each being marked with a rectangular frame.

CITATION LIST

Patent Literature

Patent Literature 1: Japanese Unexamined Patent Application Publication No. 11-321494

SUMMARY

In one embodiment, an object tracking device includes an input interface, a processor, and an output interface. The input interface is configured to acquire sensor data. The processor is configured to detect a detection target from the sensor data and track the detection target using Kalman filters associated with each of the detection target and an observed value. The output interface is configured to output a detection result regarding the detection target. The processor is configured to execute a first process to select a Kalman filter with low certainty from among a plurality of the Kalman filters associated with the same detection target or observed value as an exclusion candidate Kalman filter that could be excluded from the association. The processor is configured to execute a second process to exclude from the association and initialize the exclusion candidate Kalman filter that meets an initialization condition.

In one embodiment, an object tracking method includes an acquiring step, a tracking step, and an outputting step. The acquiring step involves acquiring sensor data. The tracking step involves detecting a detection target from the sensor data and tracking the detection target using Kalman filters associated with each of the detection target and an observed value. The outputting step involves outputting a detection result regarding the detection target. The tracking of the detection target includes a first process to select a Kalman filter with low certainty from among a plurality of the Kalman filters associated with the same detection target or observed value as an exclusion candidate Kalman filter that could be excluded from the association. The tracking of the detection target includes a second process to exclude from the association and initialize the exclusion candidate Kalman filter that meets an initialization condition.

BRIEF DESCRIPTION OF THE DRAWINGS

FIG. 8 is a diagram illustrating an example of a hierarchical structure for tracked object ID management.

DESCRIPTION OF EMBODIMENTS

Figure 1:
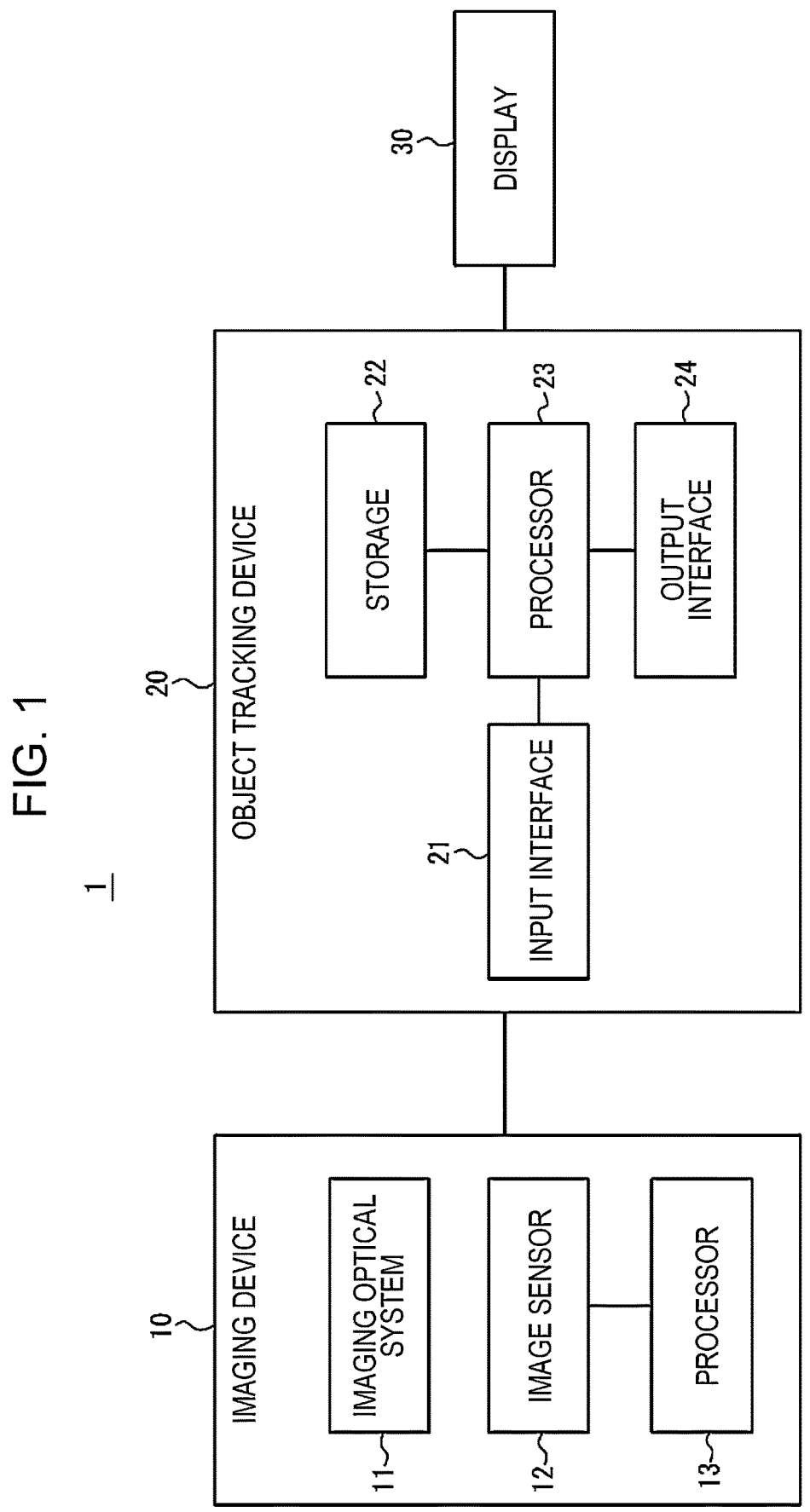
FIG. 1 is a block diagram illustrating a schematic configuration of an object tracking system including an object tracking device according to an embodiment.

Hereinafter, an embodiment of the present disclosure will be described with reference to the drawings. The drawings used in the following description are schematic. The dimensional proportions and the like in the drawings do not necessarily match the real proportions.

FIG. 1 is a block diagram illustrating a schematic configuration of an object tracking system 1. In an embodiment of the present disclosure, an object tracking device 20 is included in the object tracking system 1. In the present embodiment, the object tracking system 1 includes an imaging device 10, the object tracking device 20, and a display 30. In the present embodiment, the object tracking system 1 is mounted to a vehicle 100. The vehicle 100 is one example of a moving body, as exemplified in FIG. 2.

In the present embodiment, the object tracking device 20 acquires a moving image from the imaging device 10 as sensor data. That is, in the present embodiment, the sensor used to detect a detection target is an image sensor 12. The image sensor 12 is provided in the imaging device 10 and captures an image of visible light. However, the object tracking system 1 is not limited to the configuration illustrated in FIG. 1. The object tracking system 1 can be provided with a different device from the imaging device 10, insofar as the different device can detect a detection target. In a different example, the object tracking system 1 may be provided with a measurement device instead of the imaging device 10. The measurement device measures the distance to a detection target from a reflected wave of radiated laser light. In a different example, the object tracking system 1 may be provided with a detection device instead of the imaging device 10. The detection device includes a milli-meter-wave sensor. In a different example, the object tracking system 1 may be provided with an imaging device 10 including an image sensor 12 that captures an image of light outside the visible light range.

In the present embodiment, the object tracking system 1 is mounted to a moving body that moves. The detection target is an object 40 (see FIG. 2) in the surroundings of the moving body. However, the object tracking system 1 is not limited to being mounted to a moving body. In a different example, the object tracking system 1 may be used in a factory or other facility. In this case, the detection target may be an employee, a transport robot, a product, or the like. In a different example, the object tracking system 1 may be used in a nursing home or the like. In this case, the detection target may be an elderly person, a staff member, or the like in a room. The object tracking system 1 is not limited to performing object tracking for safe driving or safe behavior. For example, the object tracking system 1 may perform object tracking to increase work efficiency, improve quality control, or raise productivity at agricultural and industrial sites, for example. In the present disclosure, the object to be detected by the object tracking device 20 includes not only things such as moving bodies, but also people.

Figure 2:
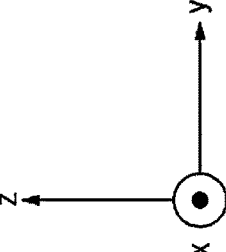
FIG. 2 is a diagram illustrating a vehicle equipped with the object tracking system in FIG. 1, and detection targets.
Figure 2:
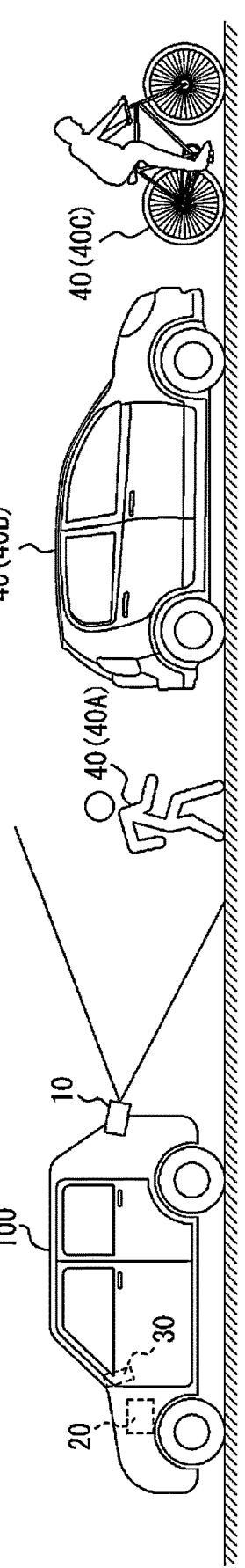

As illustrated in FIG. 2, in the present embodiment, a coordinate system in a real space is defined. In this coordinate system, the x-axis direction is defined as the lateral direction of the vehicle 100 equipped with the imaging device 10. The positive y-axis direction is defined as the backward direction of the vehicle 100. The x-axis and y-axis directions are parallel to the road surface on which the vehicle 100 is located. The z-axis direction is perpendicular to the road surface. The z-axis direction may be referred to as the vertical direction. The x-axis, y-axis, and z-axis directions are mutually orthogonal. The x-axis, y-axis, and z-axis directions are not limited to the definitions above. The x-axis, y-axis, and z-axis directions may be interchanged.

The imaging device 10 includes an imaging optical system 11, an image sensor 12, and a processor 13.

The imaging device 10 may be installed at any of various positions in or on the vehicle 100. The imaging device 10 includes, but is not limited to, a front camera, a left side camera, a right side camera, a rear camera, and the like. The front camera, left side camera, right side camera, and rear camera are installed in or on the vehicle 100 to enable image capture of the area surrounding the vehicle 100 in front, on the left side, on the right side, and behind, respectively. In the embodiment described as one example hereinafter, as illustrated in FIG. 2, the imaging device 10 is attached to the vehicle 100 to enable image capture behind the vehicle 100. The optical axis direction of the imaging device 10 points downward from the horizontal direction.

The imaging optical system 11 may include one or more lenses. The image sensor 12 may include a charge-coupled device (CCD) image sensor or a complementary MOS (CMOS) image sensor.

The imaging optical system 11 is configured to form an image of an object (subject image) on an imaging surface of the image sensor 12. The image sensor 12 is configured to convert the image of the object into an electrical signal. The image sensor 12 can capture a moving image at a predetermined frame rate. A frame is each still image included in a moving image. The frame rate refers to the number of images that can be captured every second. The frame rate may be 60 frames per second (fps) or 30 fps, for example.

The processor 13 is configured to control the imaging device 10 as a whole and execute various types of image processing on a moving image outputted from the image sensor 12. The image processing to be performed by the processor 13 may include any processing, such as distortion correction, brightness adjustment, contrast adjustment, and gamma correction.

The processor 13 may include one or more processors. For example, the processor 13 includes one or more circuits or units configured to perform one or more data computation procedures or processes by executing instructions stored in an associated memory. The processor 13 includes at least one processor, microprocessor, microcontroller, application-specific integrated circuit (ASIC), digital signal processor (DSP), programmable logic device (PLD), or field-programmable gate array (FPGA), any combination of these devices or configurations, or any combination of other known devices or configurations.

The object tracking device 20 includes an input interface 21, storage 22, a processor 23, and an output interface 24.

The input interface 21 is configured to communicate with the imaging device 10 through a wired or wireless means of communication. The input interface 21 acquires a moving image from the imaging device 10 as sensor data. The input interface 21 may correspond to the transmission scheme of an image signal that the imaging device 10 transmits. The input interface 21 may also be referred to as an inputter or acquirer. The imaging device 10 and the input interface 21 may be connected by an in-vehicle communication network, such as a control area network (CAN).

The storage 22 is a storage device storing data and a program required for processing to be performed by the processor 23. For example, the storage 22 temporarily stores a moving image acquired from the imaging device 10. For example, the storage 22 stores data generated by processing performed by the processor 23. One or more from among semiconductor memory, magnetic memory, and optical memory, for example, may be used to form the storage 22. The semiconductor memory may include volatile memory and non-volatile memory. The magnetic memory may include a hard disk and magnetic tape, for example. The optical memory may include a Compact Disc (CD), a Digital Versatile Disc (DVD), and a Blu-ray® Disc (BD), for example.

The processor 23 controls the object tracking device 20 as a whole. The processor 23 recognizes an image of an object included in a moving image acquired through the input interface 21. The processor 23 maps the coordinates of the recognized image of the object to the coordinates of the object 40 in a virtual space 46 (see FIG. 6) and tracks the position and speed of a point mass 45 (see FIG. 5) representing the object 40 in the virtual space 46. The point mass 45 is a point that has mass and is of negligible size. The virtual space 46 is a two-dimensional space in the coordinate system defined by the three axes of the x-axis, y-axis, and z-axis of the real space, with the value in the z-axis direction being set to a predetermined, fixed value. The processor 23 may map the coordinates of the tracked point mass 45 in the virtual space 46 to coordinates in a moving image.

The processor 23 detects a detection target from a moving image, and tracks the detection target using Kalman filters. The processor 23 is capable of detecting a plurality of detection targets from a moving image and tracking each of the plurality of detection targets using Kalman filters. In the technology of the related art, if a plurality of detection targets with overlapping images are detected in a moving image, tracking error occurs or the tracking accuracy is lowered. In the present embodiment, the processor 23 can avoid such problems by associating one or more Kalman filters to each of a plurality of detection targets. The processor 23 manages observed values, Kalman filters, and identification information (hereinafter "tracked object ID") unique to each tracked object in layers (tiers). The processor 23 determines whether tracked objects are the same object (same detection target) and executes a process of associating the observed values, Kalman filters, and tracked object IDs. Thus, the accuracy of tracking a plurality of detection targets can be improved further.

The processor 23 may select a Kalman filter with low certainty from among a plurality of the Kalman filters associated with the same detection target or observed value as a candidate for exclusion from association. The processor 23 may also initialize the Kalman filters. For example, if many Kalman filters are associated with the same detection target or observed value, the processor 23 can exclude some of the Kalman filters to prevent an increase in computational load. Details of the processing to be performed by the processor 23 will be described later. Like the processor 13 of the imaging device 10, the processor 23 may include a plurality of processors. Like the processor 13, the processor 23 may be a combination of multiple types of devices.

The output interface 24 is configured to output an output signal from the object tracking device 20. The output interface 24 may also be referred to as an outputter. The output interface 24 may output a detection result regarding a detection target. The detection result may be the coordinates of the point mass 45, for example.

The output interface 24 may include a physical connector and a wireless communicator. The output interface 24 may be connected to a CAN or other network of the vehicle 100, for example. The output interface 24 may be connected to the display 30, a control device and alarm device of the vehicle 100, and the like through a CAN or other communication network. Information outputted from the output interface 24 may be used, as appropriate, by each of the display 30, the control device, and the alarm device.

The display 30 may display a moving image outputted from the object tracking device 20. The display 30 may receive, from the object tracking device 20, the coordinates of the point mass 45 representing the position of the image of an object. In this case, the display 30 may have a function for generating an image element (for example, a warning to be displayed together with an approaching object) in accordance with the received coordinates, and overlaying the generated image element onto the moving image. Any of various types of devices may be adopted as the display 30. For example, a liquid crystal display (LCD), an organic electro-luminescence (EL) display, an inorganic EL display, a plasma display panel (PDP), a field emission display (FED), an electrophoretic display, or a twisting ball display may be adopted as the display 30.

Figure 3:
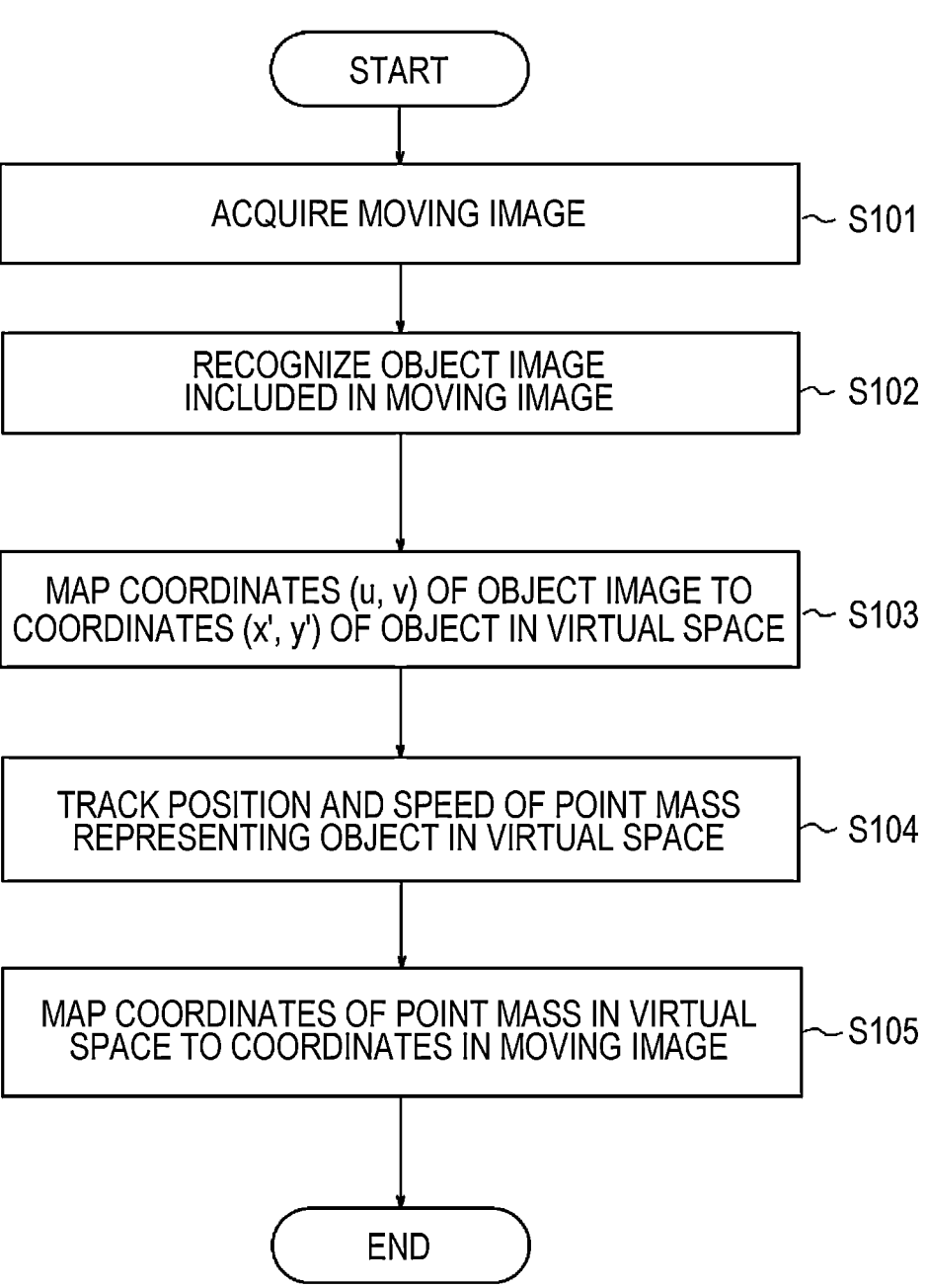
FIG. 3 is a flowchart illustrating an example of a process to track an image of an object in a moving image.

The flowchart in FIG. 3 will be referenced to describe an object tracking method executed by the object tracking device 20. The object tracking device 20 may be configured to implement the processing performed by the processor 23 described below by loading a program recorded on a non-transitory computer-readable medium. The non-transitory computer-readable medium includes, but is not limited to, a magnetic storage medium, an optical storage medium, a magneto-optical storage medium, and a semiconductor storage medium. The magnetic storage medium includes a magnetic disk, a hard disk, and magnetic tape. The optical storage medium includes a CD, DVD, BD, and other optical discs. The semiconductor storage medium includes read-only memory (ROM), electrically erasable programmable read-only memory (EEPROM), and flash memory.

The flowchart in FIG. 3 illustrates a process executed by the processor 23 to acquire sequential frames of a moving image. The processor 23 of the object tracking device 20 follows the flowchart in FIG. 3 to track (perform tracking of) the position of an object image 42 (see FIG. 4) every time a frame of a moving image is acquired. As illustrated in FIG. 2, a plurality of objects 40 may exist as detection targets. The plurality of objects 40 may include a pedestrian 40A, an automobile 40B, and a bicycle 40C. The object 40 is not limited to moving objects and people. The object 40 may include any of various target objects, such as an obstruction on a road. The following object tracking method is described using one of the plurality of objects 40 (specifically, the pedestrian 40A) included in a moving image captured by the imaging device 10 installed at the rear of the vehicle 100. Each of the other objects 40 (for example, the automobile 40B and the bicycle 40C) is tracked by a same and/or similar process.

Figure 4:
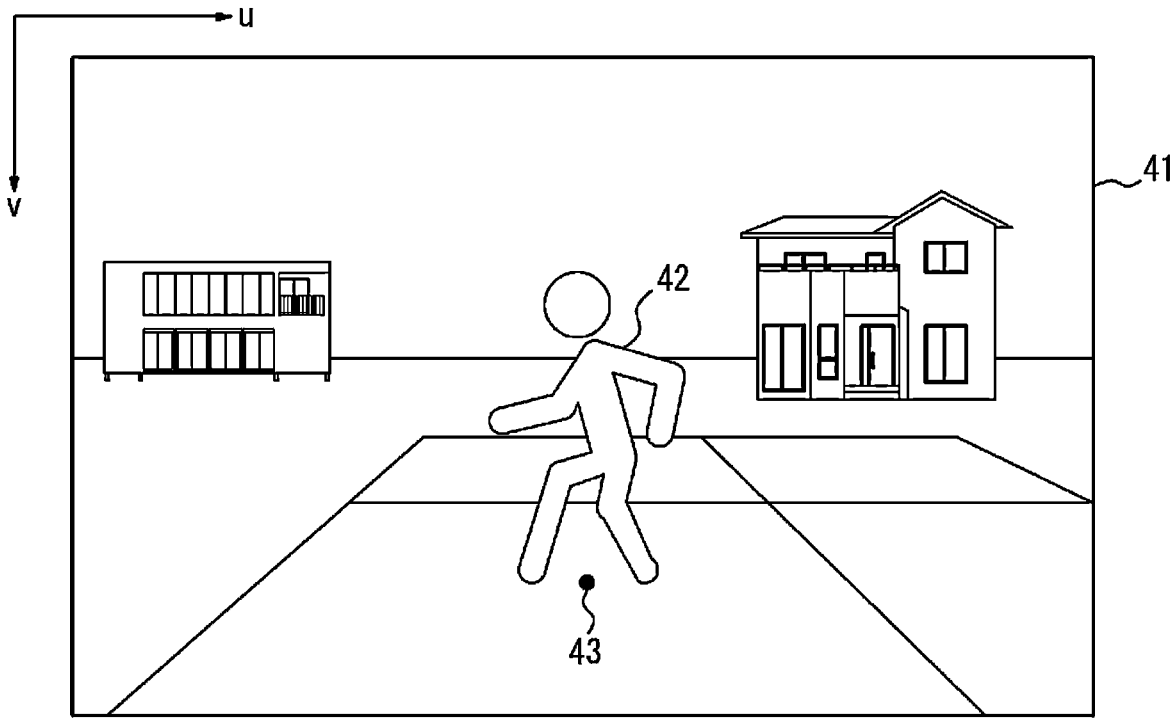
FIG. 4 is a diagram illustrating an example of an image of an object in a moving image.

The processor 23 acquires each frame of a moving image from the imaging device 10 through the input interface 21 (step S101). FIG. 4 illustrates an example of a single frame of a moving image. In the example in FIG. 4, an image (object image 42) of the object 40 behind the vehicle 100 is displayed in a two-dimensional image space 41 defined by a uv coordinate system. The u coordinate represents the horizontal direction of the image. The v coordinate represents the vertical direction of the image. In FIG. 4, the origin of the uv coordinate system is the point at the upper-left corner of the image space 41. The direction going from left to right is defined to be the positive direction of the u coordinate. The direction going from top to bottom is defined to be the positive direction of the v coordinate.

The processor 23 uses image recognize to recognize the object image 42 from each frame of the moving image (step S102). The method of recognizing the object image 42 includes any of various known methods. For example, the method of recognizing the object image 42 includes a method based on recognizing the shapes of objects such as cars and people, a method based on template matching, a method of calculating features from an image and using the features for matching, or the like. Features can be calculated by using a function approximator that can be trained to learn input-output relationships. As an example, a neural network can be used as the function approximator that can be trained to learn input-output relationships.

The processor 23 maps the coordinates (u, v) of the object image 42 in the image space 41 to coordinates (x', y') of the object in the virtual space 46 (see FIG. 6) (step S103). Generally, two-dimensional coordinates (u, v) in the image space 41 cannot be converted to coordinates (x, y, z) in the real space. However, by specifying the height of the real space and fixing the z coordinate to a predetermined value, the coordinates (u, v) in the image space 41 can be mapped to the coordinates (x', y') in the two-dimensional virtual space 46. The virtual space 46 corresponds to the coordinates $(x, y, z_0)$ in the real space ($z_0$ being the fixed value). In the present embodiment, a two-dimensional virtual space 46 is defined, but depending on the input information (type of sensor), a three-dimensional virtual space 46 may also be defined.

As illustrated in FIG. 4, a representative point 43 is specified. The representative point 43 is located in the center of the lowest part of the object image 42. For example, the representative point 43 can be set to the position in the image space 41 which is located at the lowest v coordinate and at the center of the range of u coordinates of the area occupied by the object image 42. The representative point 43 is assumed to be the position where the object 40 corresponding to the object image 42 contacts the road surface or ground surface.

Figure 5:
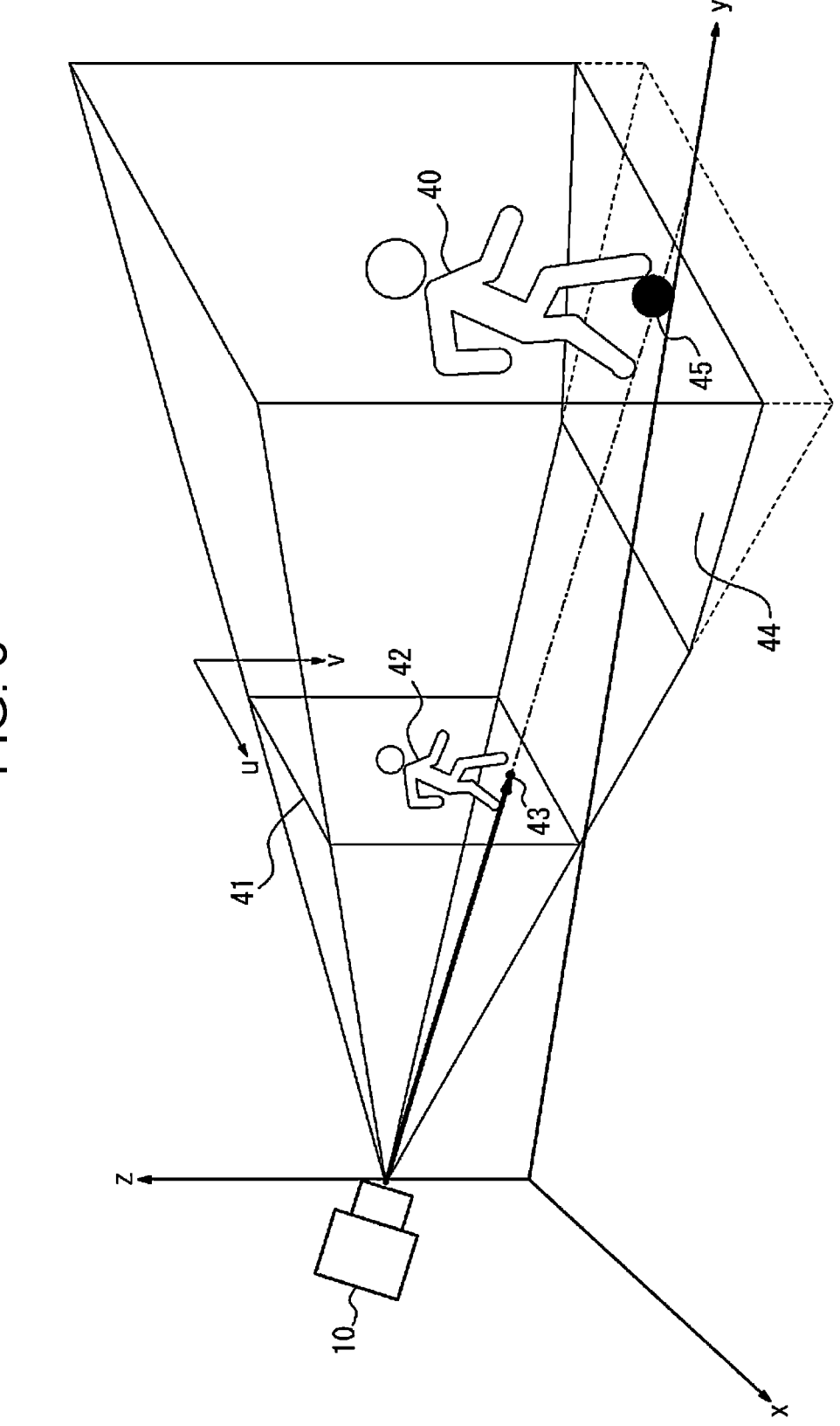
FIG. 5 is a diagram for explaining the relationship between an object in a real space, an image of the object in a moving image, and a point mass in a virtual space.

FIG. 5 illustrates the relationship between the object 40 located in the three-dimensional real space and the object image 42 in the two-dimensional image space 41. If the internal parameters of the imaging device 10 are known, the coordinates (u, v) of the image space 41 can be used as a basis for calculating the direction from the center of the imaging optical system 11 of the imaging device 10 to the corresponding coordinates (x, y, z) in the real space. The internal parameters of the imaging device 10 include information on the focal length and distortion of the imaging optical system 11, the pixel size of the image sensor 12, and the like. In the real space, the point mass 45 of the object 40 is defined to be the point where a straight line in the direction corresponding to the representative point 43 in the image space 41 intersects a reference plane 44 at z=0. The reference plane 44 corresponds to the road surface or ground surface on which the vehicle 100 is located. The point mass 45 has three-dimensional coordinates (x, y, 0). Consequently, when the two-dimensional space at z=0 is the virtual space 46, the coordinates of the point mass 45 can be expressed as (x', y'). The coordinates (x', y') of the point mass 45 in the virtual space 46 correspond to the coordinates (x, y) of a specific point of the object 40 in the xy plane (z=0) when viewing the object 40 from the direction along the z axis in the real space. The specific point corresponds to the point mass 45.

Figure 6:
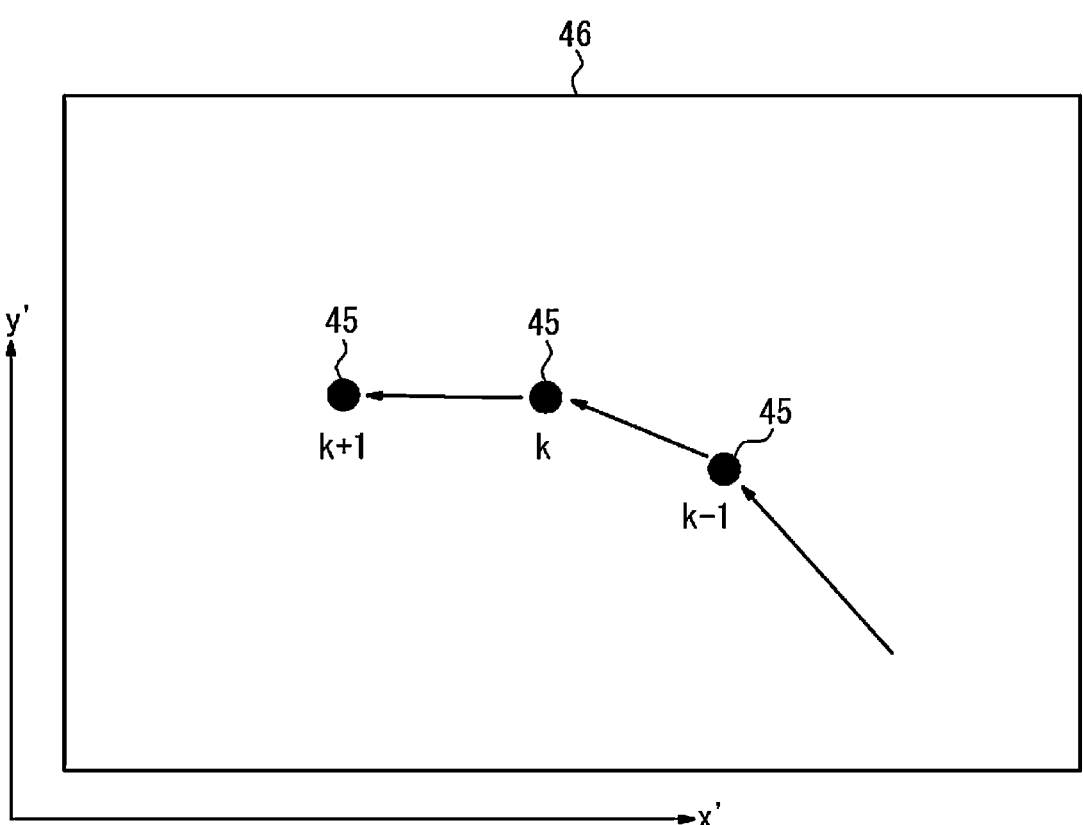
FIG. 6 is a diagram illustrating an example of the movement of a point mass in a virtual space.

As illustrated in FIG. 6, the processor 23 tracks the position (x', y') and speed ($v_{x'}$, $v_{y'}$) of the point mass 45 mapped to the virtual space 46 from the representative point 43 of the object image 42 in the virtual space 46 (step S104). Since the point mass 45 has information on position (x', y') and speed ($v_{x'}$, $v_{y'}$), the processor 23 can predict a range for the position (x', y') of the point mass 45 in a sequential frame. The processor 23 can recognize that a point mass 45 located within the predicted range in the next frame is the point mass 45 that corresponds to the tracked object image 42. The processor 23 sequentially updates the position (x', y') and speed ($v_{x'}$, $v_{y'}$) of the point mass 45 every time the processor 23 receives the input of a new frame.

To track the point mass 45, estimation using Kalman filters based on a state-space model can be adopted, for example. Prediction/estimation using Kalman filters improves robustness against false negatives, false positives, and the like of the object 40 to be detected. In general, describing the object image 42 in the image space 41 with an appropriate model describing motion is difficult. Thus, simple and accurate position estimation for the object image 42 in the image space 41 has been difficult. In the object tracking device 20 according to the present disclosure, mapping the object image 42 to the point mass 45 in the real space allows for the application of a model describing motion in the real space, thereby improving tracking accuracy for the object image 42. Handling the object 40 as the point mass 45 of negligible size allows for simple and easy tracking.

Every time the processor 23 estimates a new position of the point mass 45, the processor 23 may map the coordinates of the point mass 45 in the virtual space 46 to coordinates (u, v) in the image space 41 to indicate the estimated position (step S105). The processor 23 can map the point mass 45 located at the coordinates (x', y') in the virtual space 46 to the image space 41 as a point located at the coordinates (x, y, 0) in the real space. The processor 23 can use a known method to map the coordinates (x, y, 0) in the real space to the coordinates (u, v) in the image space 41 of the imaging device 10. The processor 23 can convert back and forth between the coordinates (u, v) in the image space 41, the coordinates (x', y') in the virtual space 46, and the coordinates (x, y, 0) in the real space.

Data Association

Figure 7:
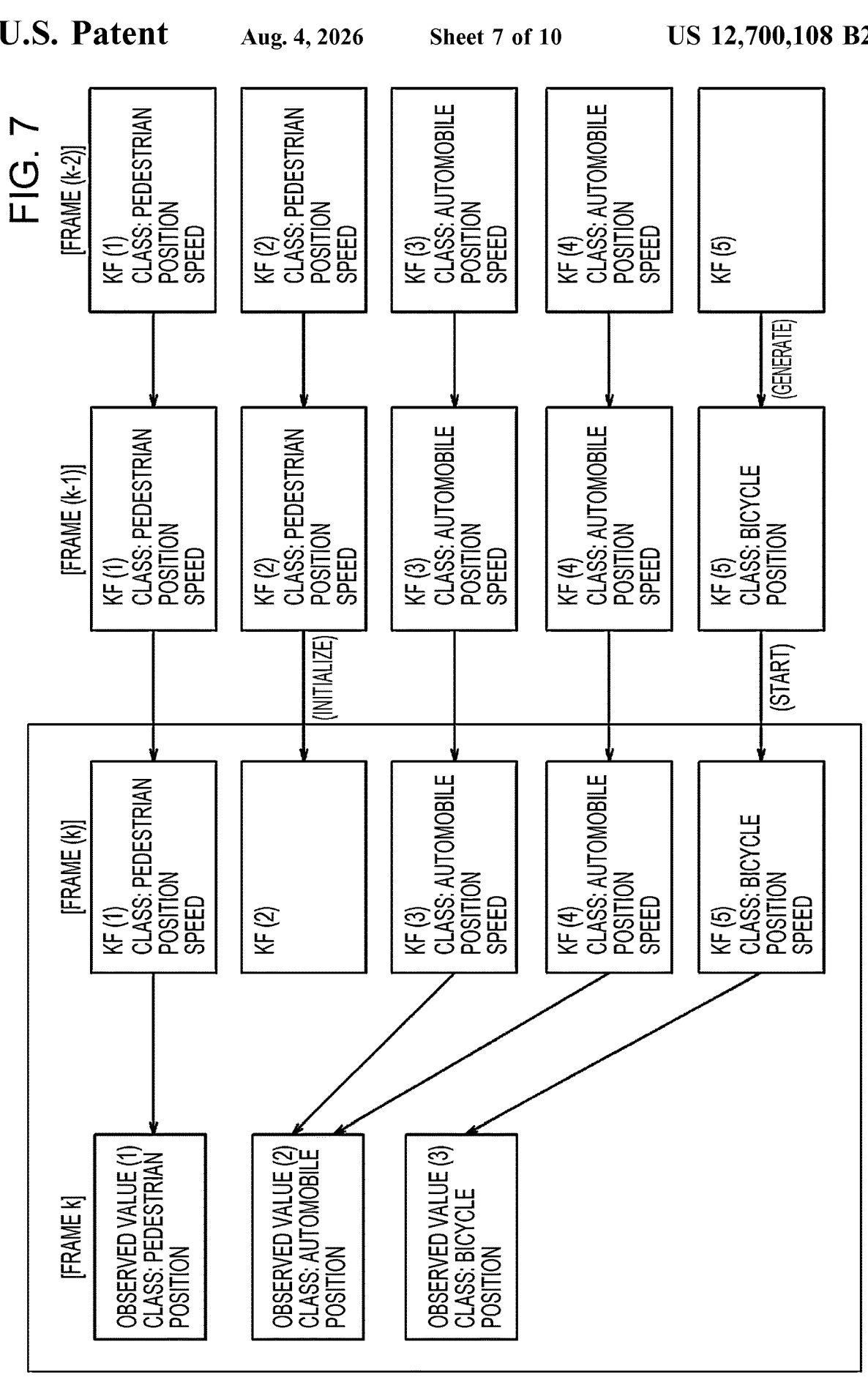
FIG. 7 is a diagram for explaining data association.

FIG. 7 is a diagram for explaining data association. Data association is a process of associating Kalman filters with observed values. In data association, a plurality of Kalman filters may be associated with a plurality of observed values. An observed value is a position of a detection target. The processor 23 assigns identifiers to distinguish the plurality of observed values and the plurality of Kalman filters. In the present embodiment, the processor 23 uses a serial number, for example, to identify each of the plurality of observed values as observed value (1), observed value (2), observed value (3), and so on. The processor 23 uses a symbol and a serial number, for example, to identify each of the plurality of Kalman filters as KF (1), KF (2), KF (3), and so on.

In the present embodiment, the processor 23 performs data association between M observed values and N Kalman filters. M is an integer equal to or greater than 2. N is an integer equal to or greater than M. In the example in FIG. 7, the processor 23 performs data association between three observed values and 5 Kalman filters. Observed value (1) is the position of the pedestrian 40A detected in frame (k) of a moving image. Observed value (2) is the position of the automobile 40B detected in frame (k) of the moving image. Observed value (3) is the position of the bicycle 40C detected in frame (k) of the moving image. Frame (k-1) is the frame that is one before frame (k) in the moving image. Frame (k-2) is the frame that is two before frame (k) in the moving image. The current frame is assumed to be frame (k).

KF (2) is used to track the pedestrian 40A up to the time of frame (k-1), but is initialized upon meeting an initialization condition described later, and is not used to track the position of the detection target. KF (5) is a Kalman filter that is newly prepared due to the new recognition of the bicycle 40C in frame (k-2). Since the newly recognized bicycle 40C is also recognized in the current frame (k), KF (5) starts tracking the detection target. The other Kalman filters each continue to track a detection target from the time of frame (k-2).

In the example in FIG. 7, the processor 23 associates KF (1) with observed value (1). The processor 23 associates KF (3) and KF (4) with observed value (2). The processor 23 associates KF (5) with observed value (3). As with the example of the observed value (2), the processor 23 allows detection results to overlap in the process of tracking a plurality of detection targets. That is, the processor 23 uses KF (3) and KF (4) to predict ranges for the position of observed value (2), namely the automobile 40B. Allowing overlap in data association in this way enables local optimization. For example, in methods that make one-to-one associations between a plurality of observed values and a plurality of Kalman filters without allowing overlap (the Hungarian algorithm is one such example), a single misassociation can create a chain reaction due to global optimization. The present embodiment allows overlap, and thus the problem of a chain reaction of misassociations does not occur. The process of tracking involves associating one or more Kalman filters with one observed value, thereby allowing for improved robustness because tracking failure does not occur readily for any of the observed values.

Tracked Object ID Management

A plurality of Kalman filters may be associated with a single observed value as above, but a plurality of observed values may also be associated with a single object to be detected. As an example, consider the case in which the detection target is the automobile 40B, which briefly disappears from the moving image due to the lane change or the like and then reappears in the moving image. In this case, a new observed value may be associated as a separate object. To track objects accurately, the object tracking device 20 preferably identifies each tracked object to ascertain the associations between tracked objects and observed values. In the present embodiment, the processor 23 executes tracked object ID management using a hierarchical structure as described below to group a plurality of Kalman filters and determine whether the grouped plurality of Kalman filters correspond to the same object.

Figure 8:
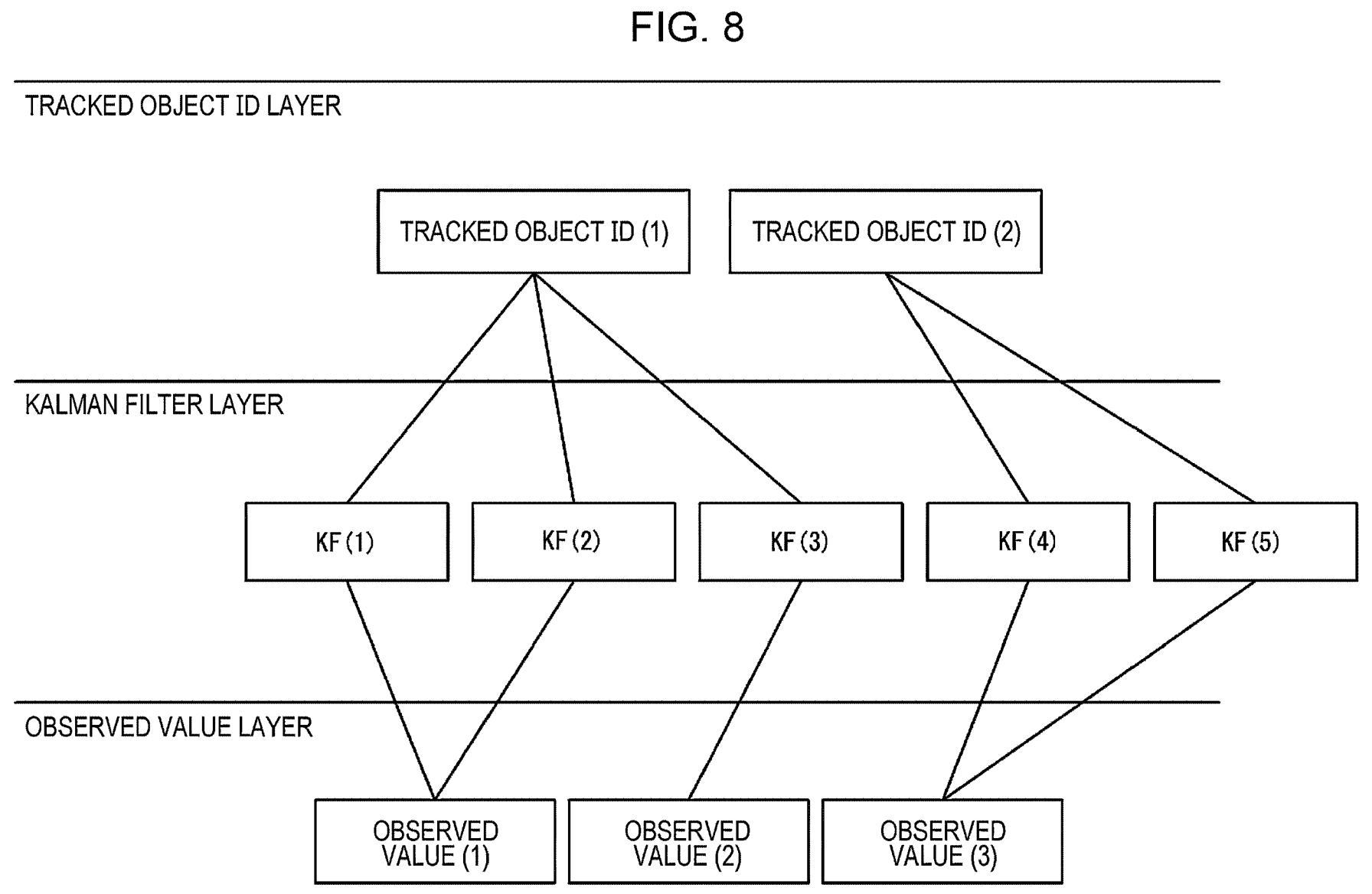

FIG. 8 is a diagram illustrating a hierarchical structure of tracked object ID management in the present embodiment. Tracked object ID management is a process of associating Kalman filters with detection targets. As illustrated in FIG. 8, the processor 23 manages observed values, Kalman filters, and tracked object IDs in layers (tiers). By associating observed values, Kalman filters, and tracked object IDs, the processor 23 is capable of accurate object tracking. As described above, a tracked object ID is identification information unique to each tracked object. If the same tracked object ID is associated with a plurality of observed values and a plurality of Kalman filters, the observed values and Kalman filters relate to the tracking of the same object.

The processor 23 groups a plurality of Kalman filters upon acquiring a frame of a moving image. The processor 23 updates the associations between the observed values, Kalman filters, and tracked object IDs. In the example in FIG. 8, the processor 23 groups KF (1), KF (2), and KF (3) and assigns the identifier "tracked object ID (1)" to an object to be tracked using these Kalman filters to control the tracking of the object. The processor 23 groups KF (4) and KF (5) and assigns the identifier "tracked object ID (2)" to an object to be tracked using these Kalman filters to controls the tracking of the object. The processor 23 controls tracking in a hierarchical structure that links the Kalman filters corresponding to an object determined to be the same and also links detection results regarding the detection target corresponding to these Kalman filters. Thus, the processor 23 is capable of accurate, error-free tracking. The processor 23 can compare or select detection results using a plurality of linked Kalman filters, for example, to obtain a detection result with high level of confidence.

Overlapping Kalman Filter Management

As above, a plurality of Kalman filters may be associated with a single observed value, and a plurality of Kalman filters may be associated with a single detection target (detection target having a single tracked object ID). Associating a plurality of Kalman filters can make tracking resistant to failure and improve robustness. However, associating many Kalman filters may increase the computational load and create latency in the control of the object tracking device 20 by the processor 23. As described below, the processor 23 executes overlapping Kalman filter management to exclude a portion of overlapping Kalman filters (a plurality of Kalman filters associated with the same detection target or observed value) from the association.

In the present embodiment, the processor 23 executes a first process and a second process as the overlapping Kalman filter management. In the first process, the processor 23 selects a Kalman filter with low "certainty" from among overlapping Kalman filters as an "exclusion candidate Kalman filter" that could be excluded from the association. The first process can be likened to pruning (trimming) Kalman filters of low importance, and can be referred to as a pruning process. In the second process, the processor 23 excludes from the association and initializes an "exclusion candidate Kalman filter" that meets an initialization condition. The second process initializes a Kalman filter into a vacant state, and therefore can be referred to as a vacating process.

The "certainty" of a Kalman filter in the first process is the degree of accuracy, or in other words, the level of confidence, in the prediction/estimation of the position of the associated detection target or observed value. The processor 23 can determine the certainty of a Kalman filter according to the size of an error ellipse, for example. The error ellipse indicates the estimation range given by a probability density distribution of position, and indicates that the position has a certain probability (as one example, 99%) of being located inside the ellipse. The processor 23 calculates the error ellipse using, among other things, the standard deviation in the x' direction and the standard deviation in the y' direction of the two-dimensional virtual space 46 (see FIG. 6). The Kalman filter with the largest error ellipse among the overlapping Kalman filters may be regarded as being of low certainty and may be selected as the "exclusion candidate Kalman filter".

The initialization condition in the second process is that a Kalman filter is selected as the exclusion candidate Kalman filter a number of times equal to a first value. The first value may be chosen freely. In one example, the first value is "5". For example, if a certain Kalman filter is selected five times as the exclusion candidate Kalman filter by the first process, the second process is executed, and the Kalman filter selected as the exclusion candidate Kalman filter for the fifth time is excluded from association with a detection target or an observed value and is initialized. The number of times that a Kalman filter is selected as the exclusion candidate Kalman filter may be consecutive or cumulative. For example, in the case of using the consecutive number of times, the number of times returns to "0" when a certain Kalman filter is not selected as the exclusion candidate Kalman filter in the first process. A counter provided to the processor 23 may count, for each Kalman filter, the number of times the Kalman filter is selected as the exclusion candidate Kalman filter.

Figure 9:
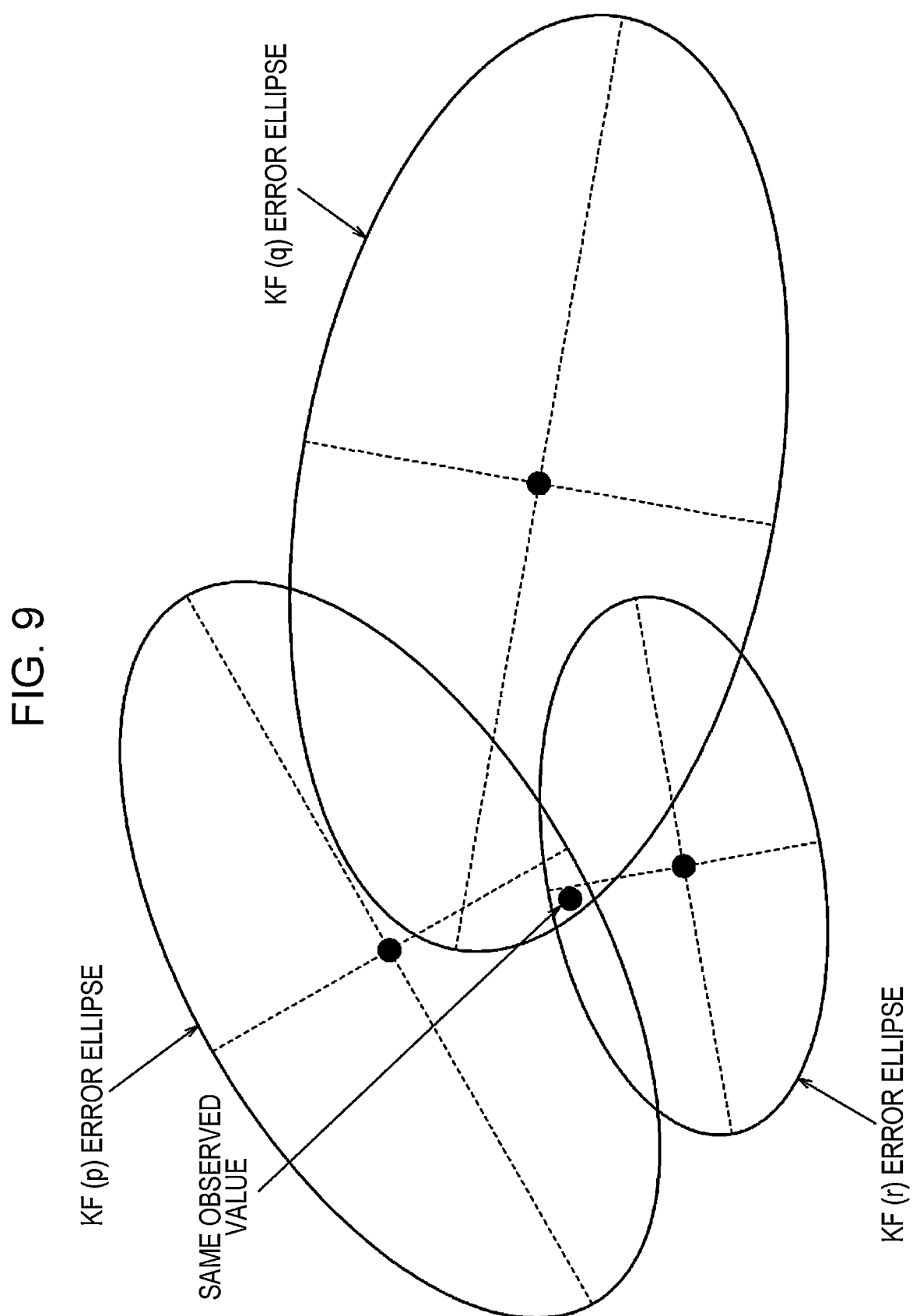
FIG. 9 is a diagram illustrating error ellipses for each of overlapping Kalman filters associated with the same observation point.

The processor 23 may execute the first and second processes in the above data association. FIG. 9 is a diagram illustrating error ellipses for each of overlapping Kalman filters associated with the same observation point in data association. A situation in which a plurality of Kalman filters are associated with the same observation point (one observed value) may occur when, for example, a single object is recognized as being two objects due to the influence of light reflection or the like, and a new Kalman filter is associated with one of the two. As above, detection target tracking control may be executed in parallel using a plurality of associated Kalman filters, but the computational processing may increase. Consequently, in data association, executing overlapping Kalman filter management is preferable.

In the example in FIG. 9, three Kalman filters KF (p), KF (q), and KF (r) are associated with the same observation point. The processor 23 calculates an error ellipse for each of the three Kalman filters. The processor 23 executes the first process to select, as the exclusion candidate Kalman filter, the Kalman filter with a relatively large error ellipse. The processor 23 may select a plurality of exclusion candidate Kalman filters. However, in the example in FIG. 9, the processor 23 selects KF (q) with the largest error ellipse as the exclusion candidate Kalman filter. The processor 23 executes the second process. In the example in FIG. 9, the processor 23 removes the association with KF (q) and initializes KF (q) upon selecting KF (q) as the exclusion candidate Kalman filter a number of times equal to the first value (for example, 5 times), or in other words, when the initialization condition is met.

The processor 23 may execute the first and second processes when the number of Kalman filters associated with the same observed value exceeds a second value. The second value may be chosen freely. In the example in FIG. 9, the second value is "2". The second value is an upper limit on the number of overlapping Kalman filters to be associated with the same observation point. The second value preferably is a small numerical value from the standpoint of reducing the computational processing burden. However, the second value is set to 2 or greater to ensure the robustness of the object tracking process. In the example in FIG. 9, the number of overlapping Kalman filters exceeds 2. Therefore, the processor 23 executes the first and second processes and initializes KF (q). Excluding KF (q) with a relatively low degree of overlap from the association prevents an increase in the computational processing by the processor 23. KF (p) and KF (r) remain associated with the same observation point, thereby ensuring the robustness of tracking the position of the detection target corresponding to the observation point.

In the example in FIG. 9, the processor 23 selects the single KF (q) as the exclusion candidate Kalman filter, but the processor 23 may select a plurality of exclusion candidate Kalman filters in the first process. Likewise, the processor 23 may initialize a plurality of exclusion candidate Kalman filters in the second process. The processor 23 may determine the number of exclusion candidate Kalman filters on the basis of the number of overlapping Kalman filters and the second value above (the upper limit on the number of overlapping Kalman filters to be associated with the same observation point). For example, if the second value is "2" and the number of overlapping Kalman filters is "5", the processor 23 may select in the first process a number of exclusion candidate Kalman filters equal to the difference, namely three. That is, in the first process, the processor 23 may select three Kalman filters with relatively large error ellipses as candidates to be excluded from association with the same observation point.

Figure 10:
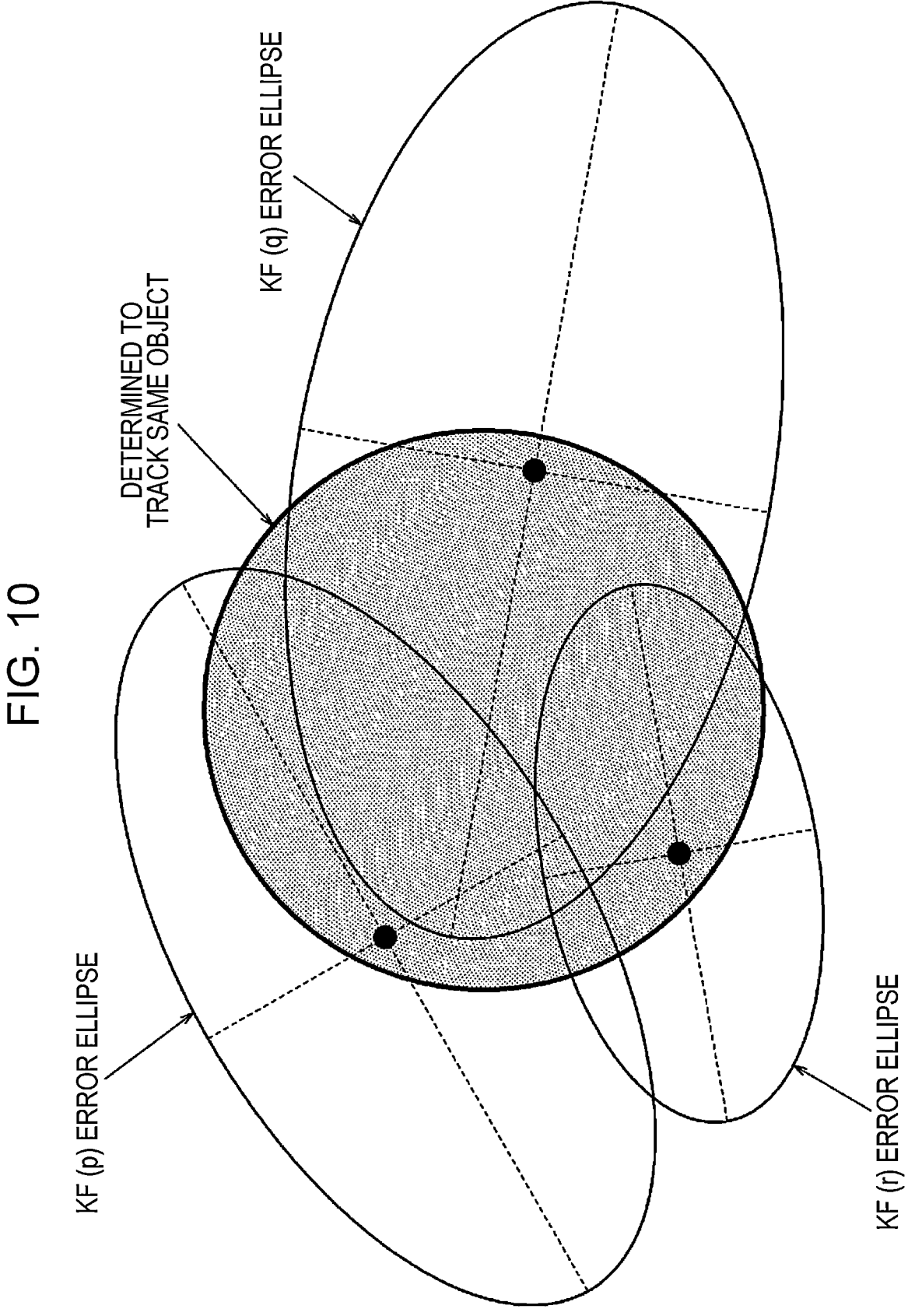
FIG. 10 is a diagram illustrating error ellipses for each of overlapping Kalman filters associated with the same detection target.

The processor 23 may execute the first and second processes in the above tracked object ID management. FIG. 10 is a diagram illustrating error ellipses for each of overlapping Kalman filters associated with the same detection target in tracked object ID management. As above, detection target tracking control may be executed in parallel using a plurality of Kalman filters associated with the same detection target (the same object having a single tracked object ID), but the computational processing may increase. Consequently, in tracked object ID management, executing overlapping Kalman filter management is preferable.

The association between the same detection target and Kalman filters in tracked object ID management is performed by clustering, such as density-based spatial clustering of applications with noise (DBSCAN), for example. As illustrated in FIG. 10, if the centers of the error ellipses for a plurality of Kalman filters are contained in a predetermined range, the processor 23 determines that the Kalman filters belong to a single group. In the example in FIG. 10, the circle indicates the predetermined range. The predetermined range may change depending on the size of the tracked object. For example, when the tracked object is the automobile 40B, a larger predetermined range may be set compared to when the tracked object is the pedestrian 40A. The predetermined range may also be fixed, irrespective of the type of tracked object. The clustering algorithm is not limited to DBSCAN. For example, clustering may be executed according to another algorithm, such as k-means clustering, for example.

In the example in FIG. 10, three Kalman filters KF (p), KF (q), and KF (r) are associated with the same detection target. Like the example in FIG. 9, the processor 23 executes the first process to select, as the exclusion candidate Kalman filter, the Kalman filter with a relatively large error ellipse. The processor 23 executes the second process. In the example in FIG. 10, the processor 23 removes the association with KF (q) and initializes KF (q) upon selecting KF (q) as the exclusion candidate Kalman filter a number of times equal to the first value (for example, 5 times), or in other words, when the initialization condition is met.

Like the example in FIG. 9, the processor 23 may execute the first and second processes when the number of Kalman filters associated with the same detection target exceeds a second value. The second value is "an upper limit on the number of overlapping Kalman filters to be associated with the same observation point" as above. In one example, the second value is "2". In the example in FIG. 10, the number of overlapping Kalman filters exceeds 2. Therefore, the processor 23 executes the first and second processes and initializes KF (q). Excluding KF (q) with a relatively low degree of overlap from the association prevents an increase in the computational processing by the processor 23. KF (p) and KF (r) remain associated with the same detection target, thereby ensuring the robustness of tracking the position of the detection target.

As another example, the processor 23 may execute the first and second processes when the number of Kalman filters associated with the same detection target exceeds a third value. The third value is "an upper limit on the number of overlapping Kalman filters to be associated with the same detection target". The third value is set irrespectively of the second value. For example, in data association, the processor 23 may execute the first and second processes when the number of overlapping Kalman filters exceeds the second value (as one example, "2"). In tracked object ID management, the processor 23 may execute the first and second processes when the number of overlapping Kalman filters exceeds the third value (as one example, "4").

The processor 23 may select or combine the above execution timings and execution conditions to execute overlapping Kalman filter management. In one example, the processor 23 may execute the first and second processes in data association and tracked object ID management. In another example, the processor 23 may execute the first and second processes only in data association, when the number of overlapping Kalman filters exceeds the second value. In another example, the processor 23 may execute the first and second processes only in tracked object ID management, when the number of overlapping Kalman filters exceeds the third value.

As above, with the above configuration, the object tracking device 20 according to the present embodiment allows detection results to overlap in the process of tracking a plurality of detection targets. Thus, the object tracking device 20 can track a plurality of objects accurately, without creating a chain reaction of misassociations. The object tracking device 20 according to the present embodiment also executes overlapping Kalman filter management in the process of tracking an object. Thus, the object tracking device
20 can track an object accurately without increasing the
computational load.

An embodiment according to the present disclosure has
been described on the basis of the drawings and examples,
but note that it would be easy for a person skilled in the art
to make various variations or revisions on the basis of the
present disclosure. Consequently, it should be understood
that these variations or revisions are included in the scope of
the present disclosure. For example, the functions and the
like included in each component, each step, and the like may
be rearranged in logically non-contradictory ways, and it is
possible to combine a plurality of components, steps, or the
like into one or divide a component, step, or the like.
Embodiments of the present disclosure have been described
mainly in terms of a device, but an embodiment of the
present disclosure may also be implemented as a method
including steps to be executed by each component of a
device. An embodiment of the present disclosure may also
be implemented as a method or program to be executed by
a processor provided in a device, or as a storage medium on
which the program is recorded. It should be understood that
these embodiments are also included in the scope of the
present disclosure. In one example, the steps of a process to
be executed by the processor 23 are included in the object
tracking method in FIG. 3, thereby also achieving the
overlapping Kalman filter management as a method.

In the above embodiment, the object tracking system 1
includes the imaging device 10, the object tracking device
20, and the display 30, but the object tracking system 1 may
include a device integrating at least two of the above
devices. For example, the imaging device 10 may include
the functions of the object tracking device 20. In this case,
the imaging device 10 may include the storage 22 and the
output interface 24 in addition to the imaging optical system
11, the image sensor 12, and the processor 13. The processor
13 may execute the processing performed by the processor
23 in the above embodiment on a moving image outputted
by the imaging device 10. Such a configuration may be used
to achieve an imaging device 10 that executes object track-
ing.

The "moving bodies" in the present disclosure include
vehicles, marine vessels, and aircraft. "Vehicles" in the
present disclosure include, but are not limited to, automo-
biles and industrial vehicles, and may include railway cars,
lifestyle vehicles, and fixed-wing aircraft that travel on a
runway. Automobiles include, but are not limited to, pas-
senger cars, trucks, buses, motorcycles, and trolleybuses,
and may include other vehicles that travel on roads. Indus-
trial vehicles include industrial vehicles for agriculture and
construction. Industrial vehicles include, but are not limited
to, forklifts and golf carts. Industrial vehicles for agriculture
include, but are not limited to, tractors, cultivators, trans-
planters, binders, combines, and lawn mowers. Industrial
vehicles for construction include, but are not limited to,
bulldozers, scrapers, excavators, cranes, dump trucks, and
road rollers. Vehicles includes human-powered vehicles.
The types of vehicles are not limited to the types given
above. For example, automobiles may include industrial
vehicles that can travel on roads, and the same vehicle may
be included in multiple types. Marine vessels in the present
disclosure include marine jets, boats, and tankers. Aircraft in
the present disclosure include fixed-wing and rotary-wing
aircraft.

REFERENCE SIGNS

1 object tracking system
10 imaging device

14

11 imaging optical system
12 image sensor
13 processor
20 object tracking device
21 input interface
22 storage
23 processor
24 output interface
30 display
40 object
40A pedestrian
40B automobile
40C bicycle
41 image space
42 object image
43 representative point
44 reference plane
45 point mass
46 virtual space
100 vehicle

The invention claimed is:
1. An object tracking device comprising:
an input interface configured to acquire sensor data,
a processor configured to detect a detection target from
the sensor data and track the detection target using
Kalman filters associated with each of the detection
target and an observed value, and
an output interface configured to output a detection result
regarding the detection target,
wherein the processor is configured to execute
a first process to select a Kalman filter with low
certainty from among a plurality of the Kalman
filters in an association with a same detection target
or an observed value as an exclusion candidate
Kalman filter that can be excluded from the associa-
tion, and
a second process to exclude from the association and
initialize the exclusion candidate Kalman filter that
meets an initialization condition, and
wherein the processor is configured to execute the first
process and the second process when a number of
Kalman filters associated with the same detection target
or the same observed value exceeds a second value.
2. The object tracking device according to claim 1,
wherein the processor is configured to determine a certainty
of a Kalman filter according to a size of an error ellipse.
3. The object tracking device according to claim 1,
wherein the initialization condition is that the Kalman filter
with low certainty is selected as the exclusion candidate
Kalman filter a number of times equal to a first value.
4. The object tracking device according to claim 1,
wherein the processor is configured to execute the first
process and the second process in a process of associating
the Kalman filters with the observed value.
5. The object tracking device according to claim 1,
wherein the processor is configured to execute the first
process and the second process in a process of associating
the Kalman filters with the detection target.
6. An object tracking method comprising:
acquiring sensor data,
detecting a detection target from the sensor data and
tracking the detection target using Kalman filters asso-
ciated with each of the detection target and an observed
value, and
outputting a detection result regarding the detection tar-
get, wherein tracking of the detection target includes a first process to select a Kalman filter with low certainty from among a plurality of the Kalman filters in an association with a same detection target or observed value as an exclusion candidate Kalman filter that can be excluded from the association, and a second process to exclude from the association and initialize the exclusion candidate Kalman filter that meets an initialization condition, and wherein tracking of the detection target includes executing the first process and the second process when a number of Kalman filters associated with the same detection target or the same observed value exceeds a second value.

* * * * *